United States Patent [19]
Hog

[11] Patent Number: 6,040,669
[45] Date of Patent: Mar. 21, 2000

[54] CONTROL DEVICE FOR AN OPTICAL SENSOR

[75] Inventor: Norbert Hog, Buehl, Germany

[73] Assignee: Robert Bosch GmbH, Stuttgart, Germany

[21] Appl. No.: 09/077,306

[22] PCT Filed: Sep. 18, 1997

[86] PCT No.: PCT/DE97/02097

§ 371 Date: Jun. 12, 1998

§ 102(e) Date: Jun. 12, 1998

[87] PCT Pub. No.: WO98/17511

PCT Pub. Date: Apr. 30, 1998

[30] Foreign Application Priority Data

Oct. 22, 1996 [DE] Germany ............... 196 43 465

[51] Int. Cl.[7] ............................................. G05B 5/00
[52] U.S. Cl. ............................. 318/480; 15/250.001
[58] Field of Search .......................... 318/443, 444, 318/480, 483

[56] References Cited

U.S. PATENT DOCUMENTS

| | | | |
|---|---|---|---|
| 4,317,073 | 2/1982 | Blaszkowski | 318/483 |
| 4,620,141 | 10/1986 | McCumber et al. | 318/483 |
| 4,859,867 | 8/1989 | Larson et al. | 318/444 |
| 4,916,374 | 4/1990 | Schierbeek et al. | 318/483 |
| 5,059,877 | 10/1991 | Teder | 318/483 |
| 5,560,245 | 10/1996 | Zettler et al. | 73/335.01 |
| 5,568,027 | 10/1996 | Teder | 318/444 |

*Primary Examiner*—Robert E. Nappi
*Assistant Examiner*—Rina I. Duda
*Attorney, Agent, or Firm*—Kenyon & Kenyon

[57] ABSTRACT

A control device for an optical sensor including an optical transmitter is used to prolong the service life of the optical transmitter, preferably a light-emitting diode, and to adjust the service life of the electronic components and, thus, prolong the service life of the optical sensor. This is achieved in that the transmitter power is able to be switched over between full power and reduced power as a function of a measuring value from the sensor.

27 Claims, 2 Drawing Sheets

CONTROL DEVICE FOR AN OPTICAL SENSOR

FIELD OF THE INVENTION

The present invention relates to a control device for an optical sensor.

BACKGROUND INFORMATION

A control device for optical rain sensors for use in vehicle windshield wiper systems is described in (U.S. Pat. No. 4,859,867), which includes a compensation circuit for ambient light, temperature and other system variables. To compensate for the ambient light, the optical transmitter (emitter device) of the rain sensor is operated with high-frequency pulsing. A receiver detects the high-frequency radiation output by the transmitter and supplies modulated signals to a microcontroller, which separates the alternating component (cyclical portion) of the signals from the direct component (non-cyclical portion) of the false signals (such as of ambient light, etc.). The frequency currently used for driving the transmitter, in this case a light-emitting diode (LED), is 1000 Hz. The preferred pulse width is 15 microseconds. The signals analyzed in the microcontroller control the wiper motor. As a secondary effect, the service life of the LED is prolonged as compared to continuous operation.

The service life is not sufficiently prolonged, however, when this high pulse frequency is used.

When the frequency is reduced and the turn-on time of the optical transmitter is kept the same to maximally prolong the service life, it becomes more and more difficult, however, to isolate the alternating component from the direct component. Moreover, the sensor's reaction time to the occurrence of moisture is adversely affected.

SUMMARY OF THE INVENTION

One of the advantages of the control device according to the present invention is that the service life of the transmitter is increased by reducing the transmitter power, without degrading the responsivity of the rain sensor. Thus, the service life of the transmitter is made to conform with the service life of the other electronic components, prolonging the service life of the entire sensor.

One advantage of the control device according to the present invention is that the control device of the optical sensor makes the distinction between dryness and moisture. In response to dryness, the transmitter is operated with reduced power and, in response to moisture, with full power.

A further advantage lies in the fact that the reduction in transmitter power is likewise achieved through a pulsed operation of the rain sensor.

What is particularly advantageous in this case is that the upper limiting value of the period duration (cycle) is matched to the reaction time of the human eye, making any delay imperceptible. On the other hand, there is no need to take external events, such as rain drops falling on a pane, into consideration, since such events transpire clearly at a slower rate than the reaction time.

Another advantage is that the degree of reduction in power can be varied by other (e.g., predetermined) parameters, such as day or night, and thus be optimally adjusted to the different needs of the motor vehicle driver. It may also be adventageous if the reduced transmitter power is pulsed with a frequency of less than 1000 Hz.

One advantage of pulsed operation is that the sensor also retains its responsivity under conditions dryness, and senses even little moisture.

One advantage of reducing the transmitter power in a nonpulsed operation is that the sensor detects a greater level of moisture without delay.

DETAILED DESCRIPTION OF THE DRAWINGS

Figure 1:
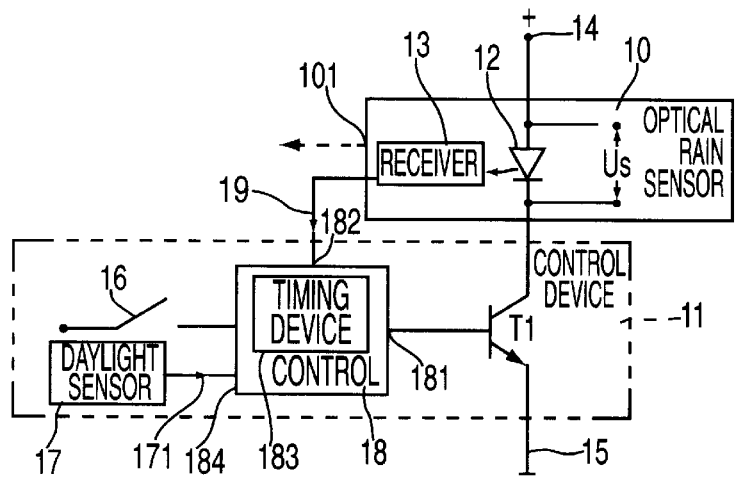
FIG. 1 shows a block diagram for a pulsed operation of a transmitter.

FIG. 1 shows a block diagram of a control device 11 for an optical rain sensor 10, which is driven in a pulsed operation. The rain sensor is used, for example, in motor vehicles for controlling a front windshield wiper. Control device 11 includes a control arrangemant with a timing device 183, a transistor T1 as a power switching element, a functional switch 16, and a day/night sensor 17. Rain sensor 10 has a light-emitting diode (LED) as an optical transmitter 12, and a receiver 13. Transmitter 12 is switched by series-connected transistor T1 Positive pole 14 of a battery voltage is connected via transmitter 12 and transistor T1 to ground 15. Control arrangement 18 is brought into circuit in response to the closing of functional switch 16. Transistor T1 is driven via a signal output 181 of control 18. The signal at output 181 has a digital profile, so that transistor T1 is effectively non-conducting or conducting. Via a signal input 182, control arrangement 18 receives measuring signals 19 from rain sensor 10 and, via a further signal input 184, other measuring signals 171 from the day/night sensor. The windshield wiper (not shown) is driven by a signal output 101, illustrated by dotted lines. Us denotes the voltage drop across transmitter 12.

Figure 2:
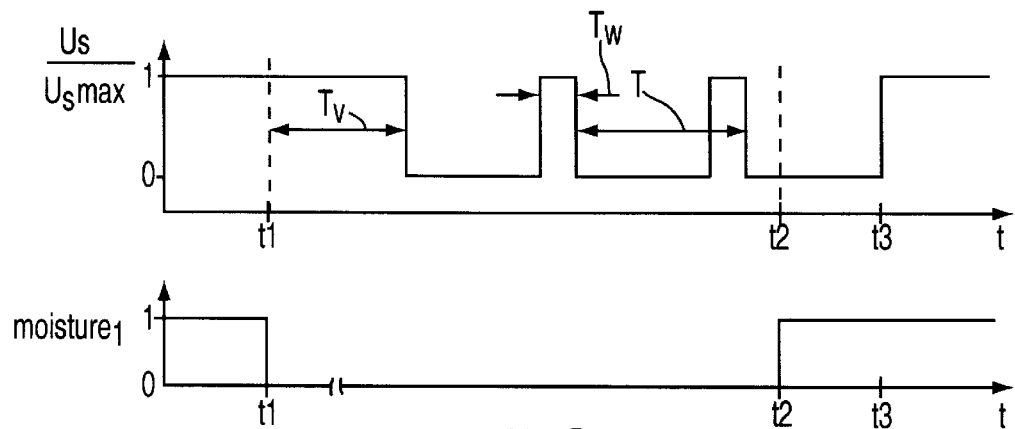
FIG. 2 shows a diagram of quotients of voltages dropping across the transmitter plotted over time, in response to a presence of moisture or dryness on a pane when working with a pulsed operation of the transmitter.

The top curve in FIG. 2 represents the relationship of voltage drop Us to maximum voltage drop Us,max across transmitter 12, plotted over time axis t. The curve profile shown corresponds to the embodiment illutrated in FIG. 1. The quotient of voltages $U_s/U_{s,max}$ assumes the values zero or one. Time axis t is subdivided into three domains t<t1, t1<t<t2, and t>t2. According to the bottom curve in FIG. 2, moisture is present before t1 and after t2. No moisture is present in the time between t1 and t2. Accordingly, transmitter 12 is driven in a pulsed operation by control device 11 only in response to a dry pane by a measuring signal 19 to this effect at input 182; on the other hand, in response to a moist pane, it is driven in a continuous operation.

The mode of operation of the control device of the present invention for an optical rain sensor shown in FIG. 1 is described below with reference to FIG. 2.

In response to moisture on the pane, T1 is forced into conduction (i.e., turned on) and transmitter 12 is operated with full power. Voltage drop Us across transmitter 12 is at a maximum, and the quotient of the voltages assumes the value of one. For as long as moisture is present, this state is retained. This is evident in FIG. 2 at t<t1.

If the pane is dry (t>t1), then, following a time Tv of about two minutes, preselected by timing device 183, during which transmitter 12 is still operated at full power, the transmitter power is pulsed over T1. During preselected time Tv, the responsivity of sensor 10 is at a maximum, so that the sensor remains fully operational during brief, intermittent showers (known as April weather). Following preselected time Tv, transmitter 12 is pulsed at periods T of 500 milliseconds and with a pulse width duration Tw of 10 milliseconds. Control 18 generates a signal to this effect for transistor T1. The quotient of the voltages at transmitter 12 assumes the value zero between the pulses, and the value one during the pulse width duration Tw.

It should be noted that the time axis in FIG. 2 shows different scales: the preselected time Tv can be two minutes or more, for example, in contrast to the period T, which only lasts for 0.5 seconds.

During the time intervals in which the quotient of the voltages becomes zero, voltage drop Us across transmitter 12 is likewise zero, i.e., T1 is effectively blocking, and transmitter 12 deenergized. Should moisture set in during these time intervals (t=t2), this is not immediately detected by sensor 10. Sensor 10 is first able to detect the moisture when transmitter 12 is again working with full responsivity (t=t3). Sensor 10 feeds measuring signal 19 back to control arrangement 18, causing control 18 to terminate the pulsed operation, and transmitter 12 to be activated by switch T1 with full, lasting responsivity. At the same time, a first wiping operating of the windshield wiper (not shown here is activated at t=t3 via indicated signal output 101 (and transmitter 12 may be maintained at full power thereafter). Wiping operations are subsequently initiated via signal output 101 as a function of the quantity of moisture detected by rain sensor 10.

Period duration T is selected to conform with the reaction time of the human eye. On average, the reaction time is about 500 milliseconds. As soon as the period duration T becomes longer than the reaction time, the driver of the motor vehicle gets the impression that the control device is reacting too slowly. Thus, the sluggishness of the human sensing capability sets an upper limit to period duration T. However, since the reaction time becomes longer due, for example, to weather, darkness, or tiredness of the driver, the upper limit can be one second. To additionally sense the influence of darkness, it is conceivable for measuring signals 171 from a day/night sensor 17 to be fed to an additional input 184 to control arrangement 18, to prolong period duration T during darkness.

Given unchanged pulse width duration Tw of ten milliseconds, a lower limit to period duration T of the pulsed radiation is defined by the objective of increasing the service life of transmitter 12. Selecting a short period duration T causes the modulation frequency to increase and the power consumption of transmitter 12 to rise. This has a negative effect, then, on the service life of transmitter 12. The lower limit can be, for example, 100 milliseconds.

The pulse width duration Tw is established at about ten milliseconds due to metrological considerations. Often, transmitter 12 of a rain sensor 10 is additionally superimposed with a high-frequency modulation, as mentioned at the outset, which has a period duration of a few milliseconds or less. To prevent interference to high-frequency modulation, pulse width duration Tw should be selected to be greater than the period duration of the high-frequency modulation.

Figure 3:
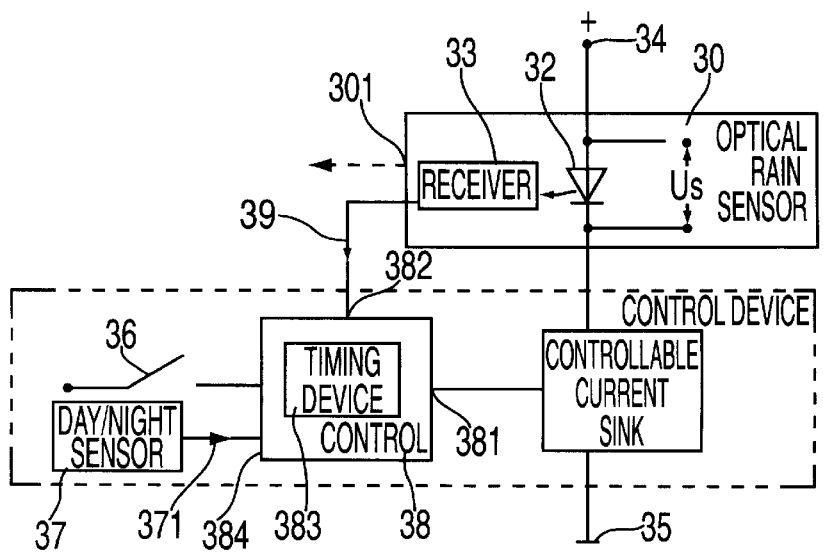
FIG. 3 shows a block diagram of the transmitter that is switchable between a reduced power and a full power.

FIG. 3 shows a block diagram of a control device 31 for an optical rain sensor 30, whose transmitter power is able to be switched over. Control device 31 includes a control 38 having a timing device 383, a controllable current sink S1, a functional switch 36, and a day/night sensor 37. The rain sensor includes a light-emitting diode as an optical transmitter 32 and a receiver 33. Transmitter 32 is connected in series to controllable current sink 33, and connected to a positive pole 34 of a battery voltage and to ground 35. Current sink S1. is controlled via a control output 381 of control 38. Via a signal input 382, control 38 receives measuring signals 39 from rain sensor 30, and via a further signal input 384, other measuring signals 371 from day/night sensor 37. In addition, control 38 is linked to a functional switch 36. Rain sensor 30 includes a further signal output 301, illutrated by dotted lines, by way of which a windshield wiper (not shown) is driven.

Figure 4:
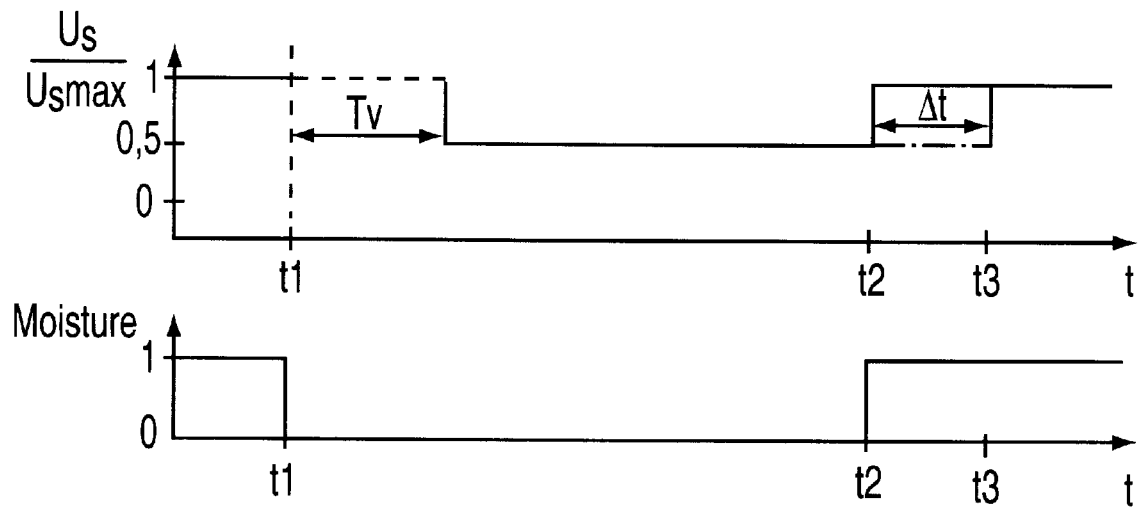
FIG. 4 shows a diagram of the quotients of the voltages dropping across the transmitter plotted over time, in response to the presence of moisture or dryness on the pane when working with the transmitter that is switchable between the reduced power and the full power in response to the presence of moisture or dryness on the pane.

FIG. 4 shows, similarly to FIG. 2, the ratio of voltage drop Us across transmitter 32 to maximum voltage drop Us,max across transmitter 32, and the presence of moisture, plotted over time axis t. The curve profile shown corresponds to the exemplary embodiment illustrated in FIG. 3. The quotient can assume values from zero to one. In this exemplary embodiment, the quotient assumes the values 0.5 or one.

The mode of operation of the control device according to the present invention for an optical rain sensor shown in FIG. 3 is described below with reference to FIG. 4:

In response to moisture, transmitter 32 is operated via current sink S1 with full power. Voltage drop Us across transmitter 32 is a maximum drop, and the quotient of voltages Us/Us,max assumes the value of one This is shown in FIG. 4 at t<t1.

If sensor 30 does not detect any more moisture (t=t1), then after a time Tv, for example two minutes, preselected by timing device 383, transmitter 32 is operated with reduced power. In addition, time Tv can be influenced by predetermined parameters (such as a day/night sensing paramenter). A control signal to this effect is fed by control arrangement 38 to controllable current sink S1. The current flow through transmitter 32 is reduced, e.g., halving voltage Us dropping across transmitter 32 and likewise reducing the power of transmitter 32. The quotient of the voltages assumes a value of 0.5 that is adjustable by control 38. The rain sensor's sensitivity diminishes.

When precipitation begins (t=t2), rain sensor 30 senses the moisture without perceptible delay and transmits measuring signal 39 to control arrangement 38. Via current sink S1, control arrangement 38 switches transmitter 32 to full power and triggers a first wiping operation of the windshield wiper (not shown here). The future wiping rate of the windshield wiper is automatically determined on the basis of the quantity of moisture detected by the rain sensor, now operated with full responsivity (t>t2).

If precipitation is slight, rain sensor 30 does not immediately detect the moisture, due to its reduced sensitivity. Not until the moisture on the pane accumulates, reaching the level of detectability by rain sensor 30, can measuring signal 39 trigger the operation of rain sensor 30 with full sensitivity. This occurs at instant t=t3. This case is shown in FIG. 4 by a dot-dash line. Time span $\Delta t = t3 - t2$ is a function, among other things, of the adjustment made to the rain sensor's sensitivity through reduced power and the quantity of moisture or type of precipitation.

The extent to which the transmitter power is reduced can be definitively preselected by control 38 or be influenced by external parameters. Thus, it is useful, for example, in combination with a day/night sensor, to adjust the sensitivity of transmitter 32, when the panes are dry, to be higher at night than during the day.

Transmitter 12 of a rain sensor 10 can likewise be additionally superimposed with a high-frequency modulation, as described above, which has a period duration of a few milliseconds or less.

Figure 5:
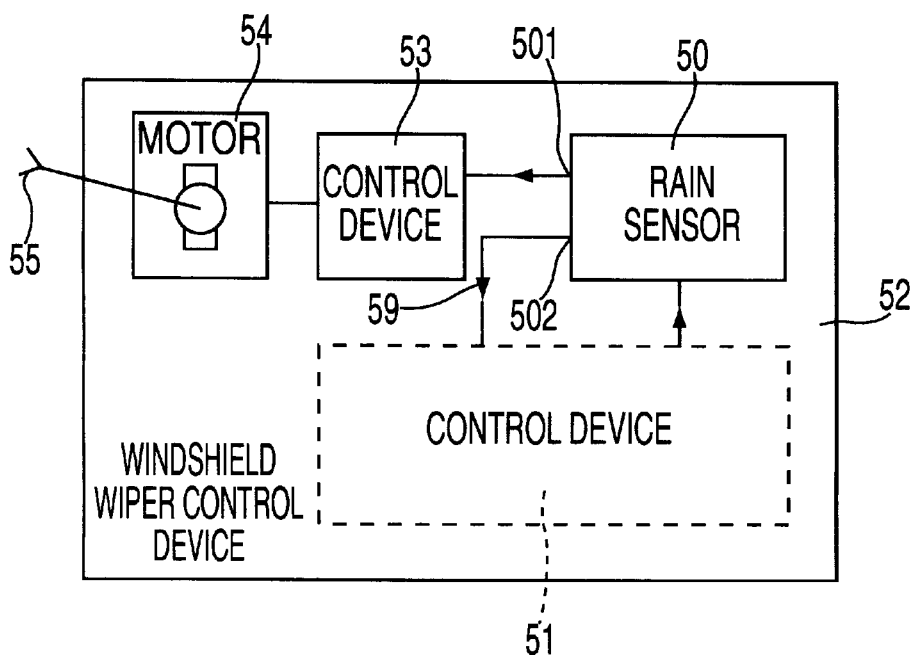
FIG. 5 shows a block diagram of the switching operation for the control device, in the case of an optical sensor in a windshield wiper control device.

FIG. 5 shows a block diagram of a windshield-wiper control further device 52 including a control device 51, rain sensor 50, further control device 53 for a wiper motor 54 and a windshield wiper 55 driven by wiper motor 54. Rain sensor 50 has two outputs 501, 502, measuring signals 59 being transmitted via output 502 to control device 51, and equivalent measuring signals 59 being transmitted via other output 501 to further control device 53 of wiper motor 54.

The moisture or dryness of a motor vehicle's windshield (not shown) that is detected by the rain sensor is routed, on the one hand, as measuring signal 59 to control device 51 of rain sensor 50. On the basis of this measuring signal 59, control device 51 switches the transmitter of rain sensor 50 to full or reduced power, the pulsed operation of rain sensor 50 likewise being detected monitored with reduced power. The mode of operation of control device 51 for rain sensor 50 can be inferred from the above-described exemplary embodiments. The same measuring signals 59 are fed via output 501 to a control device 53, which, in a generally known way, automatically drives wiper motor 54 as a function of moisture signals 59, and operates windshield wiper 55. It is not absolutely necessary for rain sensor 50 to have two outputs 501, 502. One output 502 suffices when measuring signal 59 is fed to control device 51 and further control device 53.

What is claimed is:

1. A control device for an optical sensor, the optical sensor generating a measuring signal and including an optical transmitter, the control device comprising:
   an arrangement switching a power of the optical transmitter between a full power and a reduced power as a function of the measuring signal,
   wherein, when a pane is dry and only after a predetermined time period, the optical transmitter operates at the reduced power as a function of the measuring signal.

2. The control device according to claim 1, wherein the optical sensor includes a rain sensor.

3. The control device according to claim 2, wherein the rain sensor is used in a vehicle windshield wiper system.

4. The control device according to claim 1, wherein the optical transmitter includes a light-emitting diode.

5. The control device according to claim 1, wherein the reduced power is pulsed with a frequency of less than 1000 Hz.

6. The control device according to claim 1, wherein the transmitter power is reduced as a function of predetermined parameters.

7. The control device according to claim 6, wherein the predetermined parameters include a day/night sensing parameter.

8. The control device according to claim 1, wherein, when moisture is detected, the optical transmitter operates at the full power, and wherein, after a first wiping operation, the optical transmitter operates at the full power.

9. The control device according to claim 1, wherein the optical transmitter operates at the full power after a first wiping operation.

10. The control device according to claim 1, wherein the arrangement includes a control element defining the predetermined time period.

11. The control device according to claim 1, wherein the predetermined time period is defined as a function of predetermined parameters.

12. A control device for an optical sensor, the optical sensor generating a measuring signal and including an optical transmitter, the control device comprising:
   an arrangement switching a power of the optical transmitter between a full power and a reduced power as a function of the measuring signal,
   wherein, when moisture is detected, the optical transmitter operates at the full power.

13. The control device according to claim 12, wherein the optical transmitter operates at the full power after a first wiping operation.

14. The control device according to claim 12, wherein the arrangement includes a control element defining the predetermined time period.

15. The control device according to claim 12, wherein the predetermined time period is defined as a function of predetermined parameters.

16. The control device according to claim 12, wherein, when a pane is dry and only after a predetermined time period, the optical transmitter operates at the reduced power as a function of the measuring signal.

17. A control device for an optical sensor, the optical sensor generating a measuring signal and including an optical transmitter, the control device comprising:
   an arrangement switching a power of the optical transmitter between a full power and a reduced power as a function of the measuring signal wherein a frequency of the transmitter power is superimposable on a predetermined frequency when the control device operates using one of the full power and the reduced power.

18. A windshield-wiper control device, comprising:
   a wiper motor driving a windshield wiper;
   a first control device controlling the wiper motor; and
   a second control device coupled to an optical sensor, the optical sensor generating a measuring signal and including an optical transmitter,
   wherein the second control device switches a power of the optical transmitter between a full power and a reduced power as a function of the measuring signal,
   wherein, when a pane is dry and only after a predetermined time period, the optical transmitter operates at the reduced sower as a function of the measuring signal.

19. The windshield-wiper control device according to claim 18, wherein the windshield wiper is a motor vehicle windshield wiper.

20. The windshield-wiper control device according to claim 18, wherein the optical sensor includes a rain sensor.

21. The windshield-wiper control device according to claim 18, wherein the optical transmitter operates at the full power after a first wiping operation.

22. The windshield-wiper control device according to claim 18, wherein the second control device includes a control element defining the predetermined time period.

23. The windshield-wiper control device according to claim 18, wherein the predetermined time period is defined as a function of predetermined parameters.

24. The windshield-wiper control device according to claim 18, wherein, when moisture is detected, the optical transmitter operates at the full power.

25. A windshield-wiper control device, comprising:
   a wiper motor driving a windshield wiper;
   a first control device controlling the wiper motor; and a second control device coupled to an optical sensor, the optical sensor generating a measuring signal and including an optical transmitter, wherein the second control device switches a power of the optical transmitter between a full power and a reduced power as a function of the measuring signal, and wherein, when moisture is detected, the optical transmitter operates at the full power.

26. The windshield-wiper control device according to claim 25, wherein, when a pane is dry and only after a predetermined time period, the optical transmitter operates at the reduced power as a function of the measuring signal, and wherein, after a first wiping operation, the optical transmitter operates at the full power.

27. A windshield-wiper control device, comprising:

a wiper motor driving a windshield wiper;

a first control device controlling the wiper motor; and a second control device coupled to an optical sensor, the optical sensor generating a measuring signal and including an optical transmitter, wherein the second control device switches a power of the optical transmitter between a full power and a reduced power as a function of the measuring signal, and wherein a frequency of the transmitter power is superimposable on a predetermined frequency when the second control device operates using one of the full power and the reduced power.

* * * * *

UNITED STATES PATENT AND TRADEMARK OFFICE
CERTIFICATE OF CORRECTION

PATENT NO.     : 6,040,669
DATED          : March 21, 2000
INVENTOR(S)    : Norbert Hog It is certified that error appears in the above-identified patent and that said Letters Patent is hereby corrected as shown below:

Column 2,
Line 31, change "... arrangemant..." to -- arrangement --.
Line 36, change "... T1Positive ..." to -- T1. Positive --.
Line 52, change "... illutrated..." to -- illustrated --.

Column 3,
Line 28, change "... control 18..." to -- control arrangement 18 --.
Line 31, change "... (not shown here..." to -- (not shown here) --.
Line 52, change "... T." to -- T --.

Column 4,
Line 16, change "... illutrated..." to -- illustrated --.
Line 32, change "... one This..." to -- one. This --.
Line 38, change "... paramenter ..." to -- parameter --.
Line 44, change "... control 38..." to -- control arrangement 38 --.

Column 5,
Line 9, delete "... further...".

Column 6,
Line 30, change "... signal wherein..." to -- signal, wherein --.
Line 46, change "... sower..." to -- power --.

Signed and Sealed this

Twenty-fifth Day of September, 2001

Attest:

*Nicholas P. Godici*

NICHOLAS P. GODICI
*Attesting Officer*   Acting Director of the United States Patent and Trademark Office